US012579988B2

(12) United States Patent
Bruhn et al.

(10) Patent No.: US 12,579,988 B2
(45) Date of Patent: *Mar. 17, 2026

(54) METHOD AND APPARATUS FOR CONTROLLING AUDIO FRAME LOSS CONCEALMENT

(71) Applicant: Telefonaktiebolaget L M Ericsson (publ), Stockholm (SE)

(72) Inventors: Stefan Bruhn, Sollentuna (SE); Jonas Svedberg, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 770 days.

This patent is subject to a terminal disclaimer.

(21) Appl. No.: 17/876,848

(22) Filed: Jul. 29, 2022

(65) Prior Publication Data

US 2022/0375480 A1 Nov. 24, 2022

Related U.S. Application Data

(63) Continuation of application No. 16/721,206, filed on Dec. 19, 2019, now Pat. No. 11,437,047, which is a (Continued)

(51) Int. Cl.
*G10L 19/005* (2013.01)
*G10L 19/00* (2013.01)
(Continued)

(52) U.S. Cl.
CPC ........ *G10L 19/005* (2013.01); *G10L 19/0017* (2013.01); *G10L 19/02* (2013.01);
(Continued)

(58) Field of Classification Search
CPC ............................ G10L 19/005; G10L 19/093
See application file for complete search history.

(56) References Cited

U.S. PATENT DOCUMENTS 5,890,108 A * 3/1999 Yeldener ................. G10L 19/18
704/223
5,970,440 A * 10/1999 Veldhuis ................. G10L 25/48
704/265

(Continued)

FOREIGN PATENT DOCUMENTS

EP 1 722 359 A1 11/2006
EP 1722359 B1 9/2011

(Continued)

OTHER PUBLICATIONS

Kamil K. Wojcicki, Kuldip K. Paliwal; Importance of the Dynamic Range of an Analysis Window Function for Phase-only and Magnitude-only Reconstruction of Speech; Apr. 2007; URL: https://ieeexplore.ieee.org/document/4218204 (Year: 2007).*

(Continued)

*Primary Examiner* — Richa Sonifrank
(74) *Attorney, Agent, or Firm* — Sage Patent Group

(57) ABSTRACT

In accordance with an example embodiment of the present invention, disclosed is a method and an apparatus thereof for controlling a concealment method for a lost audio frame of a received audio signal. A method for a decoder of concealing a lost audio frame comprises detecting in a property of the previously received and reconstructed audio signal, or in a statistical property of observed frame losses, a condition for which the substitution of a lost frame provides relatively reduced quality. In case such a condition is detected, the concealment method is modified by selectively adjusting a phase or a spectrum magnitude of a substitution frame spectrum.

23 Claims, 8 Drawing Sheets

Related U.S. Application Data continuation of application No. 16/407,307, filed on May 9, 2019, now Pat. No. 10,559,314, which is a continuation of application No. 15/630,994, filed on Jun. 23, 2017, now Pat. No. 10,332,528, which is a continuation of application No. 15/014,563, filed on Feb. 3, 2016, now Pat. No. 9,721,574, which is a continuation of application No. 14/422,249, filed as application No. PCT/SE2014/050068 on Jan. 22, 2014, now Pat. No. 9,293,144.

(60) Provisional application No. 61/761,051, filed on Feb. 5, 2013, provisional application No. 61/760,822, filed on Feb. 5, 2013, provisional application No. 61/760,814, filed on Feb. 5, 2013.

(51) Int. Cl.

| | |
|---|---|
| ***G10L 19/02*** | (2013.01) |
| ***G10L 19/025*** | (2013.01) |
| ***G10L 19/06*** | (2013.01) |
| ***G10L 25/45*** | (2013.01) |
| ***G10L 25/69*** | (2013.01) |

(52) U.S. Cl.

CPC ........ *G10L 19/0204* (2013.01); *G10L 19/025* (2013.01); *G10L 19/06* (2013.01); *G10L 25/45* (2013.01); *G10L 25/69* (2013.01)

(56) References Cited

U.S. PATENT DOCUMENTS

| | | | | |
|---|---|---|---|---|
| 6,526,376 | B1 * | 2/2003 | Villette | G10L 25/93 704/207 |
| 6,996,523 | B1 * | 2/2006 | Bhaskar | G10L 19/097 704/219 |
| 7,272,556 | B1 * | 9/2007 | Aguilar | G10L 19/002 704/226 |
| 7,305,338 | B2 | 12/2007 | Tashiro et al. | |
| 7,388,853 | B2 | 6/2008 | Ptasinski et al. | |
| 7,822,005 | B2 | 10/2010 | Ptasinski et al. | |
| 7,991,612 | B2 | 8/2011 | Chen et al. | |
| 8,577,482 | B2 * | 11/2013 | Herre | H04S 5/005 381/303 |
| 8,620,644 | B2 | 12/2013 | Ryu et al. | |
| 10,943,072 | B1 * | 3/2021 | Jaganmohan | G06N 5/022 |
| 11,482,232 | B2 * | 10/2022 | Bruhn | G10L 25/69 |
| 2002/0041570 | A1 | 4/2002 | Ptasinski et al. | |
| 2004/0002856 | A1 | 1/2004 | Bhaskar et al. | |
| 2004/0122680 | A1 | 6/2004 | McGowan et al. | |
| 2005/0055204 | A1 * | 3/2005 | Florencio | G10L 21/04 704/E21.017 |
| 2005/0058145 | A1 | 3/2005 | Florencio et al. | |
| 2005/0083531 | A1 * | 4/2005 | Millerd | G06T 5/80 356/450 |
| 2005/0091041 | A1 * | 4/2005 | Ramo | G10L 19/24 704/E19.044 |
| 2005/0166124 | A1 | 7/2005 | Tsuchinaga et al. | |
| 2006/0269057 | A1 * | 11/2006 | Short | G10L 25/48 380/228 |
| 2007/0124136 | A1 | 5/2007 | Den Brinker et al. | |
| 2007/0147518 | A1 | 6/2007 | Bessette | |
| 2007/0225971 | A1 | 9/2007 | Bessette | |
| 2007/0282603 | A1 | 12/2007 | Bessette | |
| 2007/0291836 | A1 | 12/2007 | Shi et al. | |
| 2008/0071530 | A1 | 3/2008 | Ehara | |
| 2008/0082343 | A1 | 4/2008 | Maeda | |
| 2008/0215317 | A1 | 9/2008 | Fejzo | |
| 2008/0235009 | A1 | 9/2008 | Heikkinen et al. | |
| 2008/0236506 | A1 | 10/2008 | Conger et al. | |
| 2008/0275580 | A1 | 11/2008 | Andersen | |
| 2008/0275695 | A1 | 11/2008 | Ramo et al. | |
| 2009/0043569 | A1 | 2/2009 | Gao | |
| 2009/0099843 | A1 * | 4/2009 | Barriac | G10L 25/69 704/E11.002 |
| 2009/0232228 | A1 | 9/2009 | Thyssen | |
| 2010/0318349 | A1 | 12/2010 | Kovesi et al. | |
| 2012/0323582 | A1 | 12/2012 | Peng et al. | |
| 2013/0238343 | A1 | 9/2013 | Schnell et al. | |
| 2013/0253922 | A1 | 9/2013 | Ehara | |
| 2014/0019142 | A1 * | 1/2014 | Mittal | G10L 19/005 704/500 |
| 2015/0051452 | A1 * | 2/2015 | Ciaccio | G06F 17/14 600/407 |
| 2015/0207842 | A1 | 7/2015 | Andersen | |
| 2016/0284356 | A1 * | 9/2016 | Bruhn | G10L 19/028 |
| 2024/0290338 | A1 * | 8/2024 | Huang | G10L 25/30 |

FOREIGN PATENT DOCUMENTS

| | | | |
|---|---|---|---|
| JP | 2000-59231 | A | 2/2000 |
| JP | 2002-229593 | A | 8/2002 |
| JP | 2006526177 | A | 11/2006 |
| JP | 2008-058667 | A | 3/2008 |
| JP | 2009-514032 | | 4/2009 |
| JP | 2009-175693 | A | 8/2009 |
| KR | 10-2005-0091034 | A | 9/2005 |
| KR | 10-2008-0070026 | | 7/2008 |
| KR | 10-2009-0082415 | A | 7/2009 |
| RU | 2009 132 935 | A | 3/2011 |
| RU | 2420815 | C2 | 6/2011 |
| RU | 2010 135 724 | A | 3/2012 |
| WO | WO 2004/059894 | A2 | 7/2004 |
| WO | WO 2004/068098 | A1 | 8/2004 |
| WO | WO 2006/079348 | A1 | 8/2006 |
| WO | WO 2008/056775 | A1 | 5/2008 |
| WO | WO 2011/127757 | A1 | 10/2011 |
| WO | 2012/158159 | A1 | 11/2012 |

OTHER PUBLICATIONS

Huan Hou, Weibei Dou; Real-time Audio Error Concealment Method Based on Sinusoidal Model; Jul. 2008 URL: https://ieeexplore.ieee.org/document/4590009 (Year: 2008).*

P. Mowlaee Begzade Mahale, A. Sayadian; Model-based Monaural Sound Separation by Split-VQ of Sinusoidal Parameters; URL: https://ieeexplore.ieee.org/stamp/stamp.jsp?tp=&arnumber=7080225 (Year: 2008).*

International Search Report, PCT Application No. PCT/SE2014/050068, Jun. 18, 2014.

Written Opinion of the International Searching Authority, PCT Application No. PCT/SE2014/050068, Jun. 18, 2014.

International Preliminary Report on Patentability, PCT Application No. PCT/SE2014/050068, May 22, 2015.

Notice of Preliminary Rejection, Korean Application No. 10-2015-7024184, Oct. 8, 2015.

Lemyre et al., "New Approach to Voiced Onset Detection In Speech Signal and Its Application for Frame Error Concealment", *IEEE International Conference on Acoustics, Speech and Signal Processing, 2008. ICASSP 2008*, Las Vegas, NV, Mar. 31-Apr. 4, 2008, pp. 4757-4760.

Lindblom et al., "Packet Loss Concealment Based on Sinusoidal Extrapolation", *2002 IEEE International Conference on Acoustics, Speech, and Signal Processing (ICASSP)*, Orlando, Florida, May 13-17, 2002, pp. 1-173—1-176.

Quatieri et al., "Audio Signal Processing Based on Sinusoidal Analysis/Synthesis", In: *Applications of Digital Signal Processing to Audio and Acoustics*, Mark Kahrs et al., ed., Dec. 31, 2002, p. 371.

Ricard, "An Implementation of Multi-Band Onset Detection", *Proceedings of the 1st Annual Music Information Retrieval Evaluation exchange (MIREX)*, Sep. 15, 2005, retrieved from the Internet: URL:http://www.music-ir.org/evaluation/mirex-results/articles/onset/ricard.pdf, 4 pp.

Wang et al., "An Efficient Transient Audio Coding Algorithm based on DCT and Matching Pursuit", *2010 3rd International Congress on Image and Signal Processing (CISP 2010)*, Yantai, China, Oct. 16-18, 2010, pp. 3082-3085.

(56) References Cited

OTHER PUBLICATIONS

Notice of Ground for Rejection with English language translation, Japanese Patent Application No. 2015-555964, Mar. 4, 2016, 8 pp.
Patent Examination Report No. 2, Australian Patent Application No. 2014215734, May 26, 2016, 5 pp.
Official Action and English language translation, RU Patent Application No. 2015137708/08, Dec. 23, 2016 (13 pp,).
Communication with European Search Report, EPO Application No. 16183917.0, Jan. 5, 2017 (13 pp,).
Quatieri et al., "Audio Signal Processing Based on Sinusoidal Analysis/Synthesis", in "Applications of Digital Signal Processing to Audio and Acoustics", Springer, Dec. 31, 2002, pp. 343-416 (XP055120751).
Office Action for Corresponding Canadian Application No. 2,978,416; Date of Mailing: May 15, 2018, 5 Pages.
Examination Report for Australian Patent Application No. 2016225836 dated Jun. 7, 2017.
Hou et al., "Real-time Audio Error Concealment Method Based on Sinusoidal Model," Published in: Audio, Language and Image Processing, ICALIP 2008, pp. 22-28 (Jul. 2008).
Serra et al., "Spectral Modeling Synthesis: A Sound Analysis/Synthesis Based on a Deterministic plus Stochastic Decomposition," Computer Music Journal, pp. 12-24 (1990).
Office Action for Corresponding Japanese Application No. 2016-251224; Date of Mailing: Apr. 2, 2018, 3 Pages; Translation Attached, 2 Pages.
Examination Report No. 1 for corresponding Australian Patent Application No. 2018203449 dated May 23, 2019, 3 pages.
Parikh et al., "Frame Erasure Concealment Using Sinusoidal Analysis-Synthesis and Its Application to MDCT-Based Codecs," 2000 IEEE ICASSP, Istanbul, Turkey, Jun. 5-9, 2000; pp. 905-908.
Office Action including English Summary for Russian Patent Application No. 2020122689 dated Oct. 13, 2021.
Office Action and Reporting Letter for Japanese Patent Application No. 2018-217479 dated Jan. 24, 2020, 7 pages.
Bartkowiak et al., "Mitigation of long gaps in music using hybrid sinusoidal+noise model with context adaptation," Signals and Electronic Systems (ICSES), 2010 International Conference on, U.S.A., IEEE, Sep. 7, 2010, p. 435-438.
English Summary of the Notice of Preliminary Rejection for corresponding Korean Patent Application No. 2016-7009636 dated Nov. 22, 2019, 3 pages.
Kazuhiro Kondoh, Study on voice packet loss interpolation method using linear prediction, Reports of the 2003 autumn meeting of the Acoustical Society of Japan, vol. I, Japan, The Acoustical Society of Japan, Sep. 17, 2003 (Japanese version available only), cited in Office Action for Japanese Patent Application No. 2018-217479 dated Jan. 24, 2020.
English Summary of the Notice of Preliminary Rejection for Korean Patent Application No. 10-2021-7009851 dated Jun. 16, 2021.
Substantive Examination Report for Philippines Patent Application No. 1/2020/500243 mailed Mar. 5, 2025, 5 pages.

* cited by examiner

METHOD AND APPARATUS FOR CONTROLLING AUDIO FRAME LOSS CONCEALMENT

CROSS REFERENCE TO RELATED APPLICATIONS

This application is a continuation of U.S. application Ser. No. 16/721,206, filed Dec. 19, 2019, which itself is a continuation of U.S. application Ser. No. 16/407,307, filed May 9, 2019 (now U.S. Pat. No. 10,559,314), which itself is a continuation of U.S. application Ser. No. 15/630,994, filed Jun. 23, 2017 (now U.S. Pat. No. 10,332,528), which itself is a continuation of U.S. application Ser. No. 15/014,563, filed Feb. 3, 2016 (now U.S. Pat. No. 9,721,574), which itself is a continuation of U.S. application Ser. No. 14/422,249, filed Feb. 18, 2015 (now U.S. Pat. No. 9,293,144), which itself is a 35 U.S.C. § 371 national stage application of PCT International Application No. PCT/SE2014/050068, filed on Jan. 22, 2014, which itself claims priority to U.S. provisional Application Nos. 61/761,051, 61/760,822, and 61/760,814, each filed Feb. 5, 2013, the disclosure and content of all of which are incorporated by reference herein in their entirety. The above-referenced PCT International Application was published in the English language as International Publication No. WO 2014/123471 A1 on 14 Aug. 2014.

TECHNICAL FIELD

The application relates to methods and apparatuses for controlling a concealment method for a lost audio frame of a received audio signal.

BACKGROUND

Conventional audio communication systems transmit speech and audio signals in frames, meaning that the sending side first arranges the signal in short segments or frames of e.g. 20-40 ms which subsequently are encoded and transmitted as a logical unit in e.g. a transmission packet. The receiver decodes each of these units and reconstructs the corresponding signal frames, which in turn are finally output as continuous sequence of reconstructed signal samples. Prior to encoding there is usually an analog to digital (A/D) conversion step that converts the analog speech or audio signal from a microphone into a sequence of audio samples. Conversely, at the receiving end, there is typically a final D/A conversion step that converts the sequence of reconstructed digital signal samples into a time continuous analog signal for loudspeaker playback.

However, such transmission system for speech and audio signals may suffer from transmission errors, which could lead to a situation in which one or several of the transmitted frames are not available at the receiver for reconstruction. In that case, the decoder has to generate a substitution signal for each of the erased, i.e. unavailable frames. This is done in the so-called frame loss or error concealment unit of the receiver-side signal decoder. The purpose of the frame loss concealment is to make the frame loss as inaudible as possible and hence to mitigate the impact of the frame loss on the reconstructed signal quality as much as possible.

Conventional frame loss concealment methods may depend on the structure or architecture of the codec, e.g. by applying a form of repetition of previously received codec parameters. Such parameter repetition techniques are clearly dependent on the specific parameters of the used codec and hence not easily applicable for other codecs with a different structure. Current frame loss concealment methods may e.g. apply the concept of freezing and extrapolating parameters of a previously received frame in order to generate a substitution frame for the lost frame.

These state of the art frame loss concealment methods incorporate some burst loss handling schemes. In general, after a number of frame losses in a row the synthesized signal is attenuated until it is completely muted after long bursts of errors. In addition the coding parameters that are essentially repeated and extrapolated are modified such that the attenuation is accomplished and that spectral peaks are flattened out.

Current state-of-the-art frame loss concealment techniques typically apply the concept of freezing and extrapolating parameters of a previously received frame in order to generate a substitution frame for the lost frame. Many parametric speech codecs such as linear predictive codecs like AMR or AMR-WB typically freeze the earlier received parameters or use some extrapolation thereof and use the decoder with them. In essence, the principle is to have a given model for coding/decoding and to apply the same model with frozen or extrapolated parameters. The frame loss concealment techniques of the AMR and AMR-WB can be regarded as representative. They are specified in detail in the corresponding standards specifications.

Many codecs out of the class of audio codecs apply for coding frequency domain techniques. This means that after some frequency domain transform a coding model is applied on spectral parameters. The decoder reconstructs the signal spectrum from the received parameters and finally transforms the spectrum back to a time signal. Typically, the time signal is reconstructed frame by frame. Such frames are combined by overlap-add techniques to the final reconstructed signal. Even in that case of audio codecs, state-of-the-art error concealment typically applies the same or at least a similar decoding model for lost frames. The frequency domain parameters from a previously received frame are frozen or suitably extrapolated and then used in the frequency-to-time domain conversion. Examples for such techniques are provided with the 3GPP audio codecs according to 3GPP standards.

SUMMARY

Current state-of-the-art solutions for frame loss concealment typically suffer from quality impairments. The main problem is that the parameter freezing and extrapolation technique and re-application of the same decoder model even for lost frames does not always guarantee a smooth and faithful signal evolution from the previously decoded signal frames to the lost frame. This leads typically to audible signal discontinuities with corresponding quality impact.

New schemes for frame loss concealment for speech and audio transmission systems are described. The new schemes improve the quality in case of frame loss over the quality achievable with prior-art frame loss concealment techniques.

The objective of the present embodiments is to control a frame loss concealment scheme that preferably is of the type of the related new methods described such that the best possible sound quality of the reconstructed signal is achieved. The embodiments aim at optimizing this reconstruction quality both with respect to the properties of the signal and of the temporal distribution of the frame losses. Particularly problematic for the frame loss concealment to provide good quality are cases when the audio signal has strongly varying properties such as energy onsets or offsets or if it is spectrally very fluctuating. In that case the described concealment methods may repeat the onset, offset or spectral fluctuation leading to large deviations from the original signal and corresponding quality loss.

Another problematic case is if bursts of frame losses occur in a row. Conceptually, the scheme for frame loss concealment according to the methods described can cope with such cases, though it turns out that annoying tonal artifacts may still occur. It is another objective of the present embodiments to mitigate such artifacts to the highest possible degree.

According to a first aspect, a method for a decoder of concealing a lost audio frame comprises detecting in a property of the previously received and reconstructed audio signal, or in a statistical property of observed frame losses, a condition for which the substitution of a lost frame provides relatively reduced quality. In case such a condition is detected, modifying the concealment method by selectively adjusting a phase or a spectrum magnitude of a substitution frame spectrum.

According to a second aspect, a decoder is configured to implement a concealment of a lost audio frame, and comprises a controller configured to detect in a property of the previously received and reconstructed audio signal, or in a statistical property of observed frame losses, a condition for which the substitution of a lost frame provides relatively reduced quality. In case such a condition is detected, the controller is configured to modify the concealment method by selectively adjusting a phase or a spectrum magnitude of a substitution frame spectrum.

The decoder can be implemented in a device, such as e.g. a mobile phone.

According to a third aspect, a receiver comprises a decoder according to the second aspect described above.

According to a fourth aspect, a computer program is defined for concealing a lost audio frame, and the computer program comprises instructions which when run by a processor causes the processor to conceal a lost audio frame, in agreement with the first aspect described above.

According to a fifth aspect, a computer program product comprises a computer readable medium storing a computer program according to the above-described fourth aspect.

An advantage with an embodiment addresses the control of adaptations frame loss concealment methods allowing mitigating the audible impact of frame loss in the transmission of coded speech and audio signals even further over the quality achieved with only the described concealment methods. The general benefit of the embodiments is to provide a smooth and faithful evolution of the reconstructed signal even for lost frames. The audible impact of frame losses is greatly reduced in comparison to using state-of-the-art techniques.

BRIEF DESCRIPTION OF THE DRAWINGS

For a more complete understanding of example embodiments of the present invention, reference is now made to the following description taken in connection with the accompanying drawings in which.

DETAILED DESCRIPTION

Figure 10:
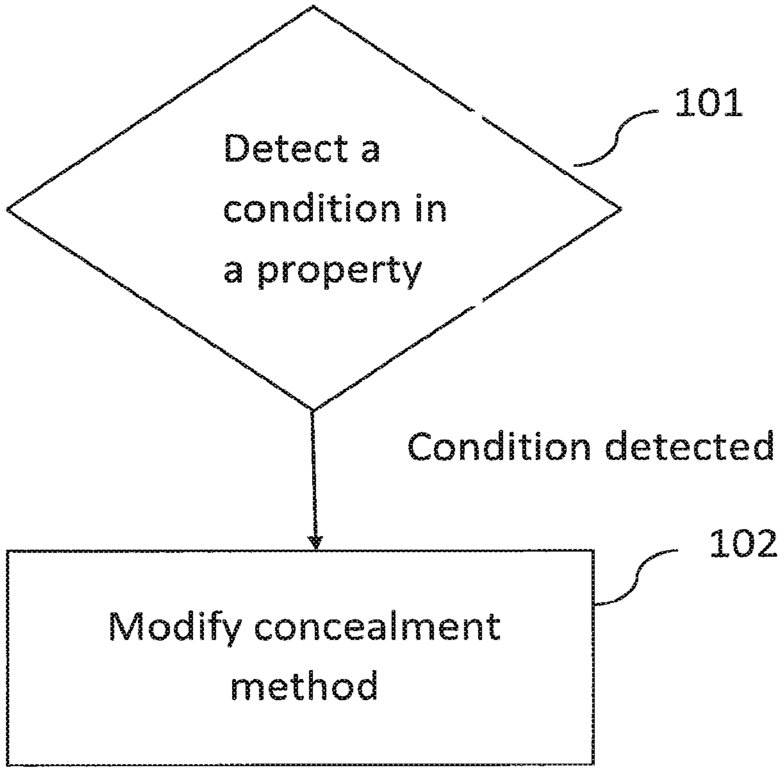
FIG. 10 is a flow chart illustrating an example method according to embodiments of the invention for controlling a concealment method for a lost audio frame of a received audio signal.

The new controlling scheme for the new frame loss concealment techniques described involve the following steps as shown in FIG. 10. It should be noted that the method can be implemented in a controller in a decoder.

1. Detect conditions in the properties of the previously received and reconstructed audio signal or in the statistical properties of the observed frame losses for which the substitution of a lost frame according to the described methods provides relatively reduced quality, 101.
2. In case such a condition is detected in step 1, modify the element of the methods according to which the substitution frame spectrum is calculated by $Z(m)=Y(m)\cdot e^{j\theta_k}$ by selectively adjusting the phases or the spectrum magnitudes, 102.

Sinusoidal Analysis

A first step of the frame loss concealment technique to which the new controlling technique may be applied involves a sinusoidal analysis of a part of the previously received signal. The purpose of this sinusoidal analysis is to find the frequencies of the main sinusoids of that signal, and the underlying assumption is that the signal is composed of a limited number of individual sinusoids, i.e. that it is a multi-sine signal of the following type:

$$s(n)=\sum_{k=1}^{K} a_k\cdot\cos\left(2\pi\frac{f_k}{f_s}\cdot n+\varphi_k\right)$$

In this equation K is the number of sinusoids that the signal is assumed to consist of. For each of the sinusoids with index k=1 . . . K, $a_k$ is the amplitude, $f_k$ is the frequency, and $\varphi_k$ is the phase. The sampling frequency is denominated by $f_s$ and the time index of the time discrete signal samples s(n) by n.

It is of main importance to find as exact frequencies of the sinusoids as possible. While an ideal sinusoidal signal would have a line spectrum with line frequencies $f_k$, finding their true values would in principle require infinite measurement time. Hence, it is in practice difficult to find these frequencies since they can only be estimated based on a short measurement period, which corresponds to the signal segment used for the sinusoidal analysis described herein; this signal segment is hereinafter referred to as an analysis frame. Another difficulty is that the signal may in practice be time-variant, meaning that the parameters of the above equation vary over time. Hence, on the one hand it is desirable to use a long analysis frame making the measurement more accurate; on the other hand a short measurement period would be needed in order to better cope with possible signal variations. A good trade-off is to use an analysis frame length in the order of e.g. 20-40 ms.

A preferred possibility for identifying the frequencies of the sinusoids $f_k$ is to make a frequency domain analysis of the analysis frame. To this end the analysis frame is transformed into the frequency domain, e.g. by means of DFT or DCT or similar frequency domain transforms. In case a DFT of the analysis frame is used, the spectrum is given by:

$$X(m) = DFT(w(n)\cdot x(n)) = \sum_{n-0}^{L-1} e^{-j\frac{2\pi}{L}}\cdot w(n)\cdot x(n)$$

Figure 1:
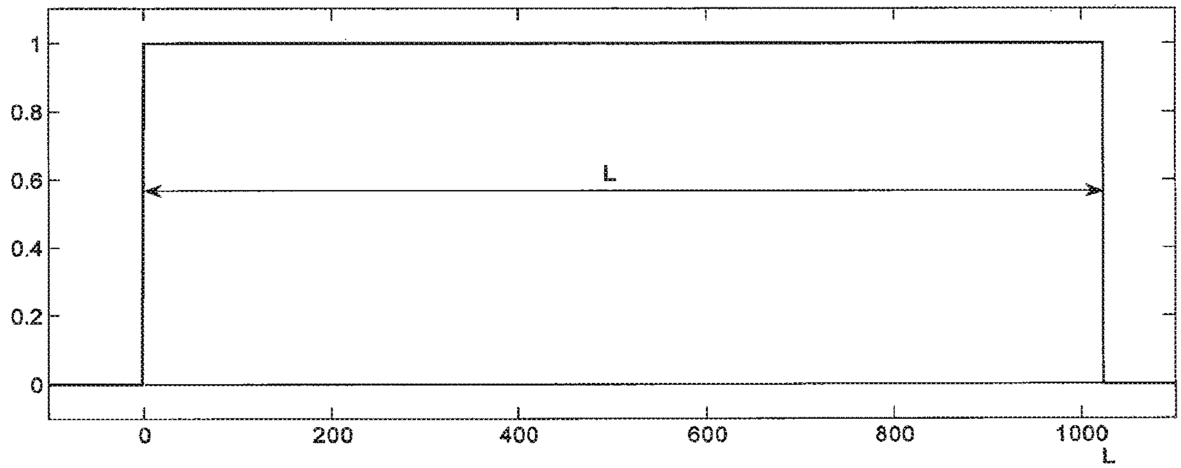
FIG. 1 shows a rectangular window function.
Figure 2:
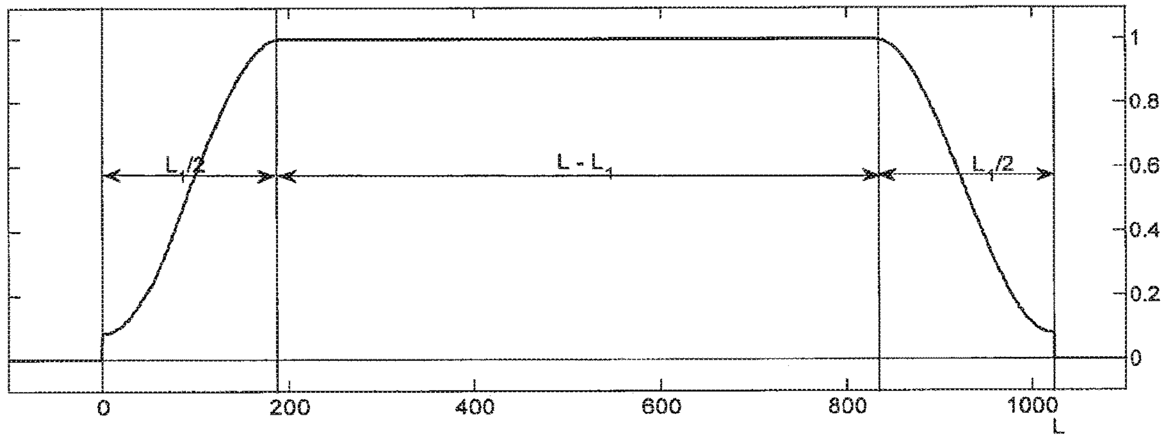
FIG. 2 shows a combination of the Hamming window with the rectangular window.

In this equation w(n) denotes the window function with which the analysis frame of length L is extracted and weighted. Typical window functions are e.g. rectangular windows that are equal to 1 for n∈[0 . . . L−1] and otherwise 0 as shown in FIG. 1. It is assumed here that the time indexes of the previously received audio signal are set such that the analysis frame is referenced by the time indexes n=0 . . . L−1. Other window functions that may be more suitable for spectral analysis are, e.g., Hamming window, Hanning window, Kaiser window or Blackman window. A window function that is found to be particular useful is a combination of the Hamming window with the rectangular window. This window has a rising edge shape like the left half of a Hamming window of length L1 and a falling edge shape like the right half of a Hamming window of length L1 and between the rising and falling edges the window is equal to 1 for the length of L−L1, as shown in FIG. 2.

The peaks of the magnitude spectrum of the windowed analysis frame |X(m)| constitute an approximation of the required sinusoidal frequencies $f_k$. The accuracy of this approximation is however limited by the frequency spacing of the DFT. With the DFT with block length L the accuracy is limited to $$\frac{f_s}{2L}.$$

Experiments show that this level of accuracy may be too low in the scope of the methods described herein. Improved accuracy can be obtained based on the results of the following consideration:

The spectrum of the windowed analysis frame is given by the convolution of the spectrum of the window function with the line spectrum of the sinusoidal model signal S(Ω), subsequently sampled at the grid points of the DFT:

$$X(m) = \int_{2\pi}\delta\left(\Omega - m\cdot\frac{2\pi}{L}\right)\cdot(W(\Omega) * S(\Omega))\cdot d\Omega.$$

By using the spectrum expression of the sinusoidal model signal, this can be written as $$X(m) = \frac{1}{2}\int_{2\pi}\left[\delta\left(\Omega - m\cdot\frac{2\pi}{L}\right)\right]\cdot\sum_{k=1}^{k} a_k\left(\left(W(\Omega) + 2\pi\frac{f_k}{f_s}\right)\cdot e^{-j\varphi_k} + W\left(\Omega - 2\pi\frac{f_k}{f_s}\right)\cdot e^{j\varphi_k}\right)\cdot d\Omega.$$

Hence, the sampled spectrum is given by $$X(m) = \frac{1}{2}\sum_{k=1}^{K} a_k\cdot\left(\left(W\left(2\pi\left(\frac{m}{L} + \frac{f_k}{f_s}\right)\right)\cdot e^{-j\varphi_k} + W\left(2\pi\left(\frac{m}{L} - \frac{f_k}{f_s}\right)\right)\cdot e^{j\varphi_k}\right)\right),$$

with $m = 0 \ldots L-1$.

Based on this consideration it is assumed that the observed peaks in the magnitude spectrum of the analysis frame stem from a windowed sinusoidal signal with K sinusoids where the true sinusoid frequencies are found in the vicinity of the peaks. Let $m_k$ be the DFT index (grid point) of the observed $k^{th}$ peak, then the corresponding frequency is $$\hat{f}_k = \frac{m_k}{L}\cdot f_s$$

which can be regarded an approximation of the true sinusoidal frequency $f_k$. The true sinusoid frequency $f_k$ can be assumed to lie within the interval $$\left[(m_k - 1/2)\cdot\frac{f_s}{L}, (m_k + 1/2)\cdot\frac{f_s}{L}\right].$$

Figure 3:
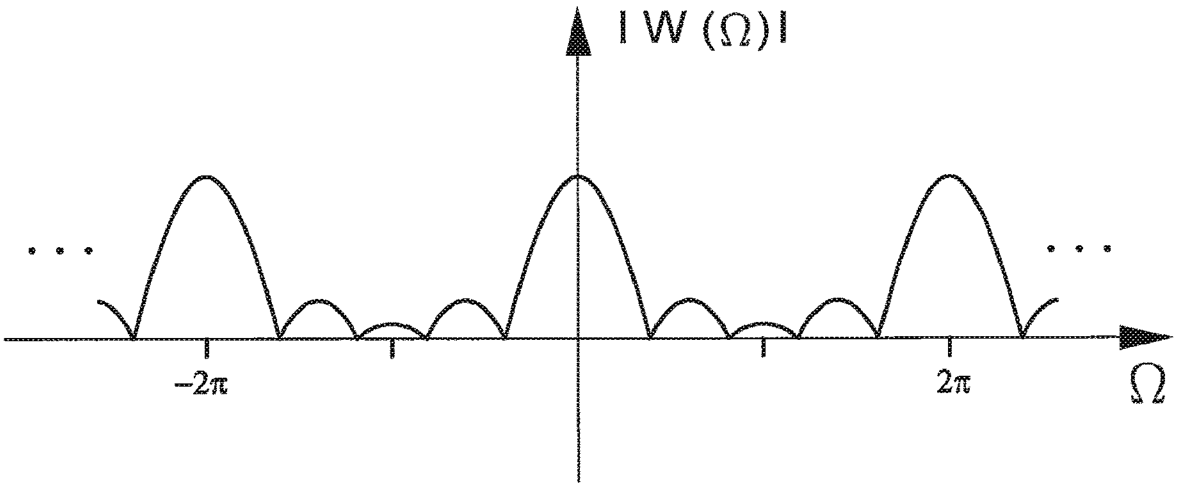
FIG. 3 shows an example of a magnitude spectrum of a window function.
Figure 4:
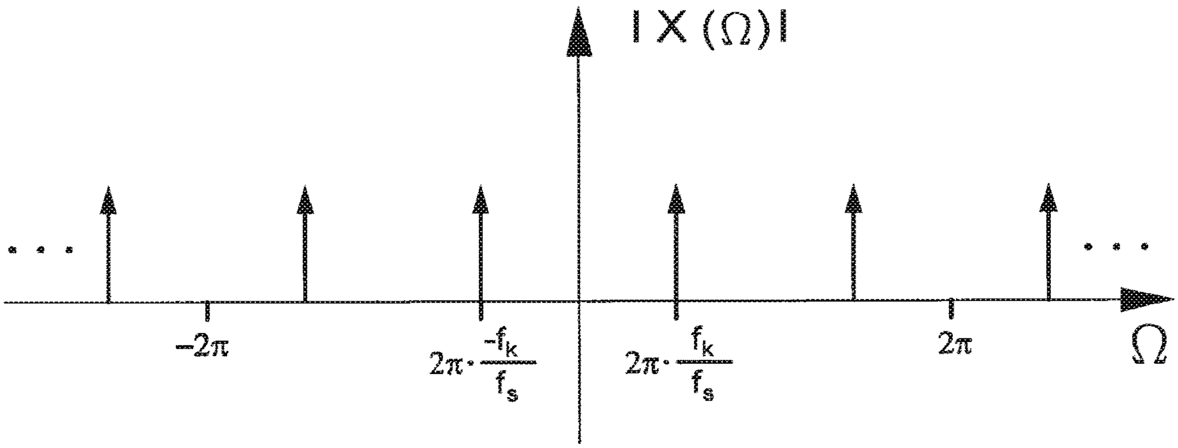
FIG. 4 illustrates a line spectrum of an exemplary sinusoidal signal with the frequency $f_k$.
Figure 5:
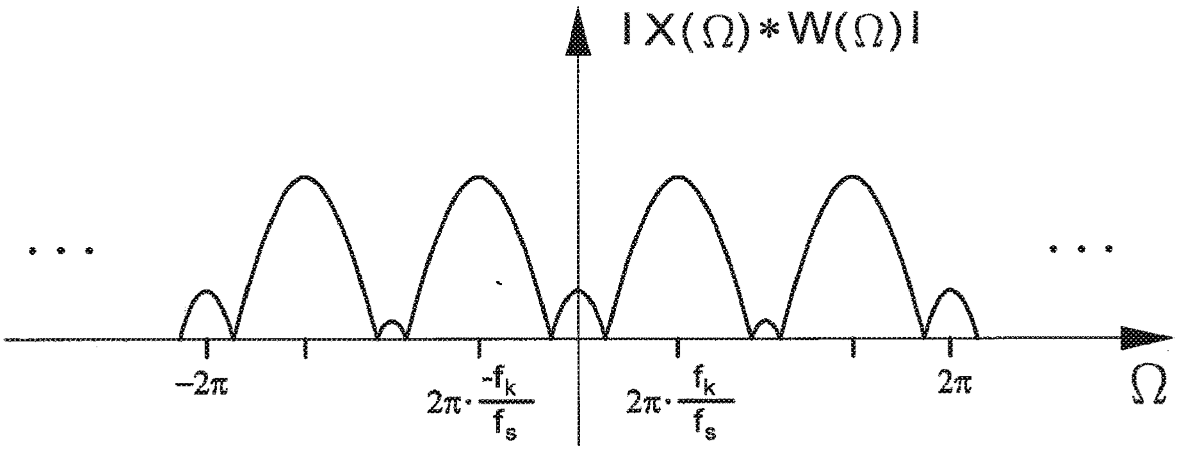
FIG. 5 shows a spectrum of a windowed sinusoidal signal with the frequency $f_k$.

For clarity it is noted that the convolution of the spectrum of the window function with the spectrum of the line spectrum of the sinusoidal model signal can be understood as a superposition of frequency-shifted versions of the window function spectrum, whereby the shift frequencies are the frequencies of the sinusoids. This superposition is then sampled at the DFT grid points. These steps are illustrated by the following figures. FIG. 3 displays an example of the magnitude spectrum of a window function. FIG. 4 shows the magnitude spectrum (line spectrum) of an example sinusoidal signal with a single sinusoid of frequency. FIG. 5 shows the magnitude spectrum of the windowed sinusoidal signal that replicates and superposes the frequency-shifted window spectra at the frequencies of the sinusoid. The bars in FIG. 6 correspond to the magnitude of the grid points of the DFT of the windowed sinusoid that are obtained by calculating the DFT of the analysis frame. It should be noted that all spectra are periodic with the normalized frequency parameter Ω where Ω=2π that corresponds to the sampling frequency $f_s$.

Figure 6:
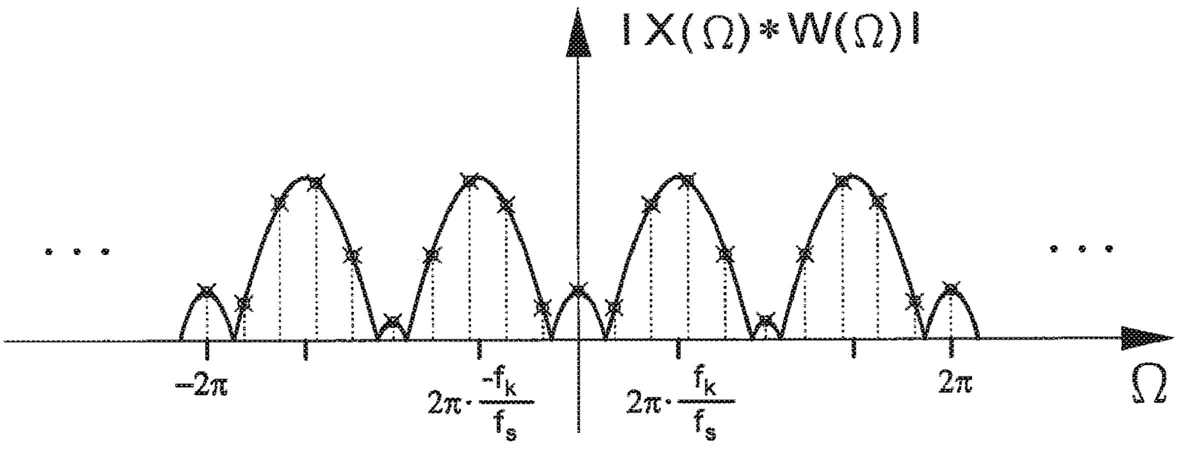
FIG. 6 illustrates bars corresponding to the magnitude of grid points of a DFT, based on an analysis frame.

The previous discussion and the illustration of FIG. 6 suggest that a better approximation of the true sinusoidal frequencies can only be found through increasing the resolution of the search over the frequency resolution of the used frequency domain transform.

One preferred way to find better approximations of the frequencies $f_k$ of the sinusoids is to apply parabolic interpolation. One such approach is to fit parabolas through the grid points of the DFT magnitude spectrum that surround the peaks and to calculate the respective frequencies belonging to the parabola maxima. A suitable choice for the order of the parabolas is 2. In detail the following procedure can be applied:

1. Identify the peaks of the DFT of the windowed analysis frame. The peak search will deliver the number of peaks K and the corresponding DFT indexes of the peaks. The peak search can typically be made on the DFT magnitude spectrum or the logarithmic DFT magnitude spectrum.
2. For each peak k (with k=1 . . . K) with corresponding DFT index $m_k$ fit a parabola through the three points $\{P1; P2; P3\}=\{(m_k-1, \log(|X(m_k-1)|); (m_k, \log(|X(m_k)|); (m_k+1, \log(|X(m_k+1)|)\}$. This results in parabola coefficients $b_k(0)$, $b_k(1)$, $b_k(2)$ of the parabola defined by $$p_k(q) = \sum_{i=0}^{2} b_k(i) \cdot q^i.$$

Figure 7:
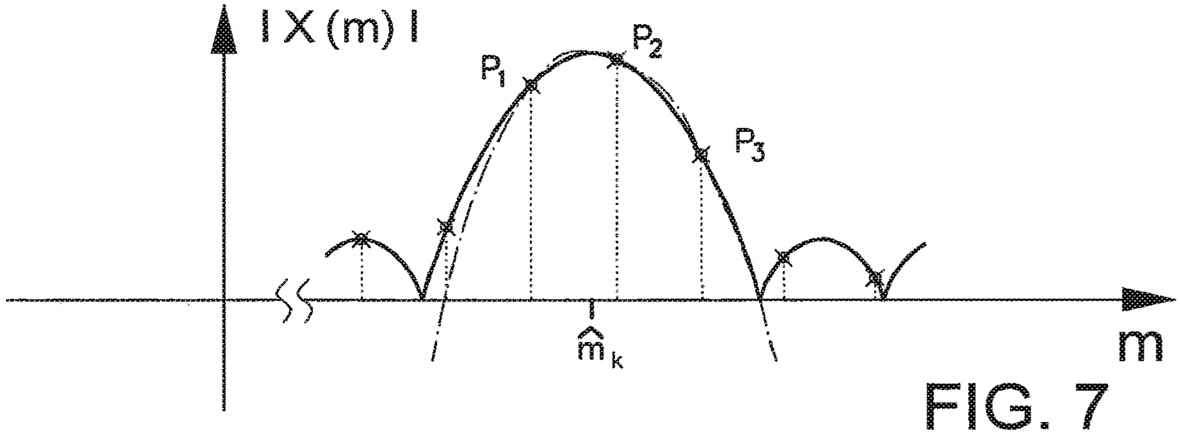
FIG. 7 illustrates a parabola fitting through DFT grid points P1, P2 and P3.

This parabola fitting is illustrated in FIG. 7.

3. For each of the K parabolas calculate the interpolated frequency index $\hat{m}_k$ corresponding to the value of q for which the parabola has its maximum. Use $\hat{f}_k=\hat{m}_k\, f_{s/L}$ as approximation for the sinusoid frequency $f_k$ The described approach provides good results but may have some limitations since the parabolas do not approximate the shape of the main lobe of the magnitude spectrum $|W(\Omega)|$ of the window function. An alternative scheme doing this is an enhanced frequency estimation using a main lobe approximation, described as follows.

Figure 8:
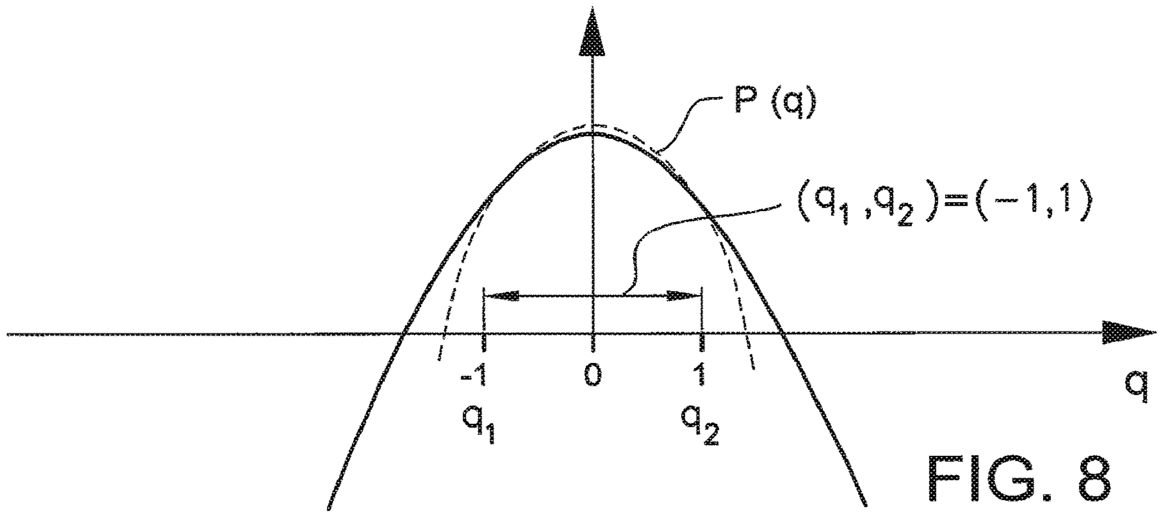
FIG. 8 illustrates a fitting of a main lobe of a window spectrum.

The main idea of this alternative is to fit a function P(q), which approximates the main lobe of $$\left|W\left(\frac{2\pi}{L} \cdot q\right)\right|,$$

through the grid points of the DFT magnitude spectrum that surround the peaks and to calculate the respective frequencies belonging to the function maxima. The function P(q) could be identical to the frequency-shifted magnitude spectrum $$\left|W\left(\frac{2\pi}{L} \cdot (q - \hat{q})\right)\right|$$

of the window function. For numerical simplicity it should however rather for instance be a polynomial which allows for straightforward calculation of the function maximum. The following detailed procedure can be applied:

1. Identify the peaks of the DFT of the windowed analysis frame. The peak search will deliver the number of peaks K and the corresponding DFT indexes of the peaks. The peak search can typically be made on the DFT magnitude spectrum or the logarithmic DFT magnitude spectrum.
2. Derive the function P(q) that approximates the magnitude spectrum $$\left|W\left(\frac{2\pi}{L} \cdot q\right)\right|$$

of the window function or of the logarithmic magnitude spectrum log $$\left|W\left(\frac{2\pi}{L} \cdot q\right)\right|$$

for a given interval $(q_1,q_2)$ The choice of the approximation function approximating the window spectrum main lobe is illustrated by FIG. 8.

Figure 9:
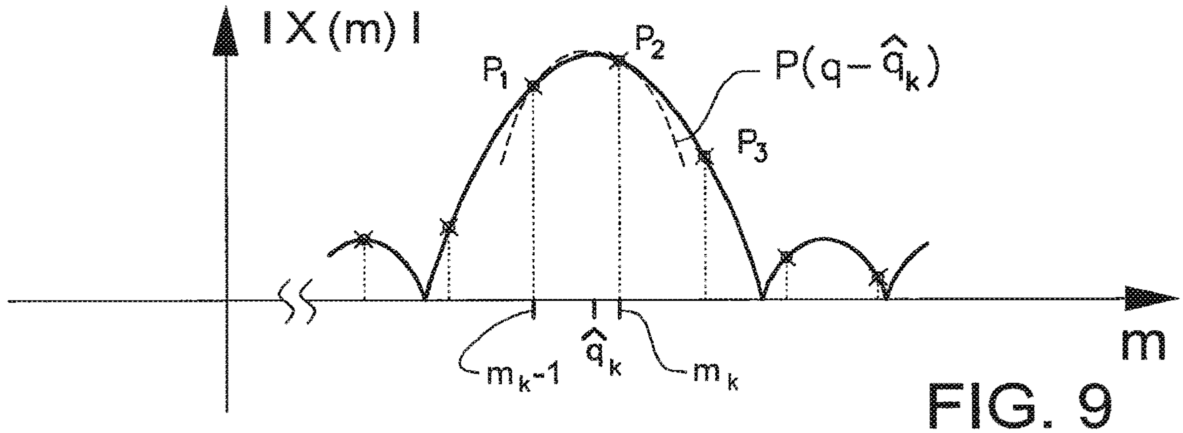
FIG. 9 illustrates a fitting of main lobe approximation function P through DFT grid points P1 and P2.

3. For each peak k (with k=1 . . . K) with corresponding DFT index $m_k$ fit the frequency-shifted function $P(q-\hat{q}_k)$ through the two DFT grid points that surround the expected true peak of the continuous spectrum of the windowed sinusoidal signal. Hence, if $|X(m_k-1)|$ is larger than $|X(m_k+1)|$ fit $P(q-\hat{q}_k)$ through the points $\{P_1; P_2\}=\{(m_k-1, \log(|X(m_k-1)|); (m_k, \log(|X(m_k)|)\}$ and otherwise through the points $\{P_1; P_2\}=\{(m_k, \log(|X(m_k)|); (m_k+1, \log(|X(m_k+1)|)\}$. P(q) can for simplicity be chosen to be a polynomial either of order 2 or 4. This renders the approximation in step 2 a simple linear regression calculation and the calculation of $\hat{q}_k$ straightforward. The interval $(q_1,q_2)$ can be chosen to be fixed and identical for all peaks, e.g. $(q_1,q_2)=(-1,1)$, or adaptive.
   In the adaptive approach the interval can be chosen such that the function $P(q-\hat{q}_k)$ fits the main lobe of the window function spectrum in the range of the relevant DFT grid points $\{P_1; P_2\}$. The fitting process is visualized in FIG. 9.
4. For each of the K frequency shift parameters $\hat{q}_k$ for which the continuous spectrum of the windowed sinusoidal signal is expected to have its peak calculate $\hat{f}_k=\hat{q}_k \cdot f_{s/L}$ as approximation for the sinusoid frequency $f_k$.

There are many cases where the transmitted signal is harmonic meaning that the signal consists of sine waves which frequencies are integer multiples of some fundamental frequency $f_0$. This is the case when the signal is very periodic like for instance for voiced speech or the sustained tones of some musical instrument. This means that the frequencies of the sinusoidal model of the embodiments are not independent but rather have a harmonic relationship and stem from the same fundamental frequency. Taking this harmonic property into account can consequently improve the analysis of the sinusoidal component frequencies substantially.

One enhancement possibility is outlined as follows:

1. Check whether the signal is harmonic. This can for instance be done by evaluating the periodicity of signal prior to the frame loss. One straightforward method is to perform an autocorrelation analysis of the signal. The maximum of such autocorrelation function for some time lag $\tau>0$ can be used as an indicator. If the value of this maximum exceeds a given threshold, the signal can be regarded harmonic. The corresponding time lag $\tau$ then corresponds to the period of the signal which is related to the fundamental frequency through $$f_0 = \frac{f_s}{\tau}.$$

Many linear predictive speech coding methods apply so-called open or closed-loop pitch prediction or CELP coding using adaptive codebooks. The pitch gain and the associated pitch lag parameters derived by such coding methods are also useful indicators if the signal is harmonic and, respectively, for the time lag.

A further method for obtaining $f_0$ is described below.

2. For each harmonic index j within the integer range $1 \ldots J_{max}$ check whether there is a peak in the (logarithmic) DFT magnitude spectrum of the analysis frame within the vicinity of the harmonic frequency $f_j = j \cdot f_0$. The vicinity of $f_j$ may be defined as the delta range around $f_j$ where delta corresponds to the frequency resolution of the DFT $$\frac{f_s}{L},$$

i.e. the interval $$\left[j \cdot f_0 - \frac{f_s}{2 \cdot L},\ j \cdot f_0 + \frac{f_s}{2 \cdot L}\right].$$

In case such a peak with corresponding estimated sinusoidal frequency $\hat{f}_k$ is present, supersede $\hat{f}_k$ by $\hat{\hat{f}}_k = j \cdot f_0$.

For the two-step procedure given above there is also the possibility to make the check whether the signal is harmonic and the derivation of the fundamental frequency implicitly and possibly in an iterative fashion without necessarily using indicators from some separate method. An example for such a technique is given as follows:

For each $f_{0,p}$ out of a set of candidate values $\{f_{0,1} \ldots f_{0,P}\}$ apply the procedure step 2, though without superseding $\hat{f}_k$ but with counting how many DFT peaks are present within the vicinity around the harmonic frequencies, i.e. the integer multiples of $f_{0,p}$. Identify the fundamental frequency $f_{0,pmax}$ for which the largest number of peaks at or around the harmonic frequencies is obtained. If this largest number of peaks exceeds a given threshold, then the signal is assumed to be harmonic. In that case $f_{0,pmax}$ can be assumed to be the fundamental frequency with which step 2 is then executed leading to enhanced sinusoidal frequencies $\hat{\hat{f}}_k$. A more preferable alternative is however first to optimize the fundamental frequency $f_0$ based on the peak frequencies $\hat{f}_k$ that have been found to coincide with harmonic frequencies. Assume a set of M harmonics, i.e. integer multiples $\{n_1 \ldots n_M\}$ of some fundamental frequency that have been found to coincide with some set of M spectral peaks at frequencies $\hat{f}_{k(m)}$, m=1 . . . M, then the underlying (optimized) fundamental frequency $f_{0,opt}$ can be calculated to minimize the error between the harmonic frequencies and the spectral peak frequencies. If the error to be minimized is the mean square error $$E_2 = \sum_{m=1}^{M} \left(n_m \cdot f_0 - \hat{f}_{k(m)}\right)^2,$$

then the optimal fundamental frequency is calculated as $$f_{0,opt} = \frac{\sum_{m=1}^{M} n_m \cdot \hat{f}_{k(m)}}{\sum_{m=1}^{M} n_m^2}.$$

The initial set of candidate values $\{f_{0,1} \ldots f_{0,P}\}$ can be obtained from the frequencies of the DFT peaks or the estimated sinusoidal frequencies $\hat{f}_k$.

A further possibility to improve the accuracy of the estimated sinusoidal frequencies $\hat{f}_k$ is to consider their temporal evolution. To that end, the estimates of the sinusoidal frequencies from a multiple of analysis frames can be combined for instance by means of averaging or prediction. Prior to averaging or prediction a peak tracking can be applied that connects the estimated spectral peaks to the respective same underlying sinusoids.

Applying the Sinusoidal Model

The application of a sinusoidal model in order to perform a frame loss concealment operation described herein may be described as follows.

It is assumed that a given segment of the coded signal cannot be reconstructed by the decoder since the corresponding encoded information is not available. It is further assumed that a part of the signal prior to this segment is available. Let y(n) with n=0 . . . N−1 be the unavailable segment for which a substitution frame z(n) has to be generated and y(n) with n<0 be the available previously decoded signal. Then, in a first step a prototype frame of the available signal of length L and start index $n_{-1}$ is extracted with a window function w(n) and transformed into frequency domain, e.g. by means of DFT:

$$Y_{-1}(m) = \sum_{n=0}^{L-1} y(n - n_{-1}) \cdot w(n) \cdot e^{-j\frac{2\pi}{L}nm}.$$

The window function can be one of the window functions described above in the sinusoidal analysis. Preferably, in order to save numerical complexity, the frequency domain transformed frame should be identical with the one used during sinusoidal analysis.

In a next step the sinusoidal model assumption is applied. According to that the DFT of the prototype frame can be written as follows:

$$Y_{-1}(m) = \frac{1}{2}\sum_{k=1}^{K} a_k \cdot \left(\left(W\left(2\pi\left(\frac{m}{L} + \frac{f_k}{f_s}\right)\right) \cdot e^{-j\varphi_k} + W\left(2\pi\left(\frac{m}{L} - \frac{f_k}{f_s}\right)\right) \cdot e^{j\varphi_k}\right)\right).$$

The next step is to realize that the spectrum of the used window function has only a significant contribution in a frequency range close to zero. As illustrated in FIG. 3 the magnitude spectrum of the window function is large for frequencies close to zero and small otherwise (within the normalized frequency range from —7C to 7E, corresponding to half the sampling frequency). Hence, as an approximation it is assumed that the window spectrum W(m) is non-zero only for an interval $M=[-m_{min}, m_{max}]$, with $m_{min}$ and $m_{max}$ being small positive numbers. In particular, an approximation of the window function spectrum is used such that for each k the contributions of the shifted window spectra in the above expression are strictly non-overlapping. Hence in the above equation for each frequency index there is always only at maximum the contribution from one summand, i.e. from one shifted window spectrum. This means that the expression above reduces to the following approximate expression:

$$\hat{Y}_{-1}(m) = \frac{a_k}{2}\cdot W\left(2\pi\left(\frac{m}{L}-\frac{f_k}{f_s}\right)\right)\cdot e^{j\varphi_k}$$

for non-negative $m \in M_k$ and for each k.

Herein, $M_k$ denotes the integer interval $$M_k = \left[\text{round}\left(\frac{f_k}{f_s}\cdot L\right) - m_{min,k},\ \text{round}\left(\frac{f_k}{f_s}\cdot L\right) + m_{max,k}\right],$$

where $m_{min,k}$ and $m_{max,k}$ fulfill the above explained constraint such that the intervals are not overlapping. A suitable choice for $m_{min,k}$ and $m_{max,k}$ is to set them to a small integer value δ, e.g. δ=3. If however the DFT indices related to two neighboring sinusoidal frequencies $f_k$ and $f_{k+1}$ are less than 2δ, then δ is set to floor $$\left(\frac{\text{round}\left(\frac{f_{k+1}}{f_s}\cdot L\right) - \text{round}\left(\frac{f_k}{f_s}\cdot L\right)}{2}\right)$$

such that it is ensured that the intervals are not overlapping. The function floor (·) is the closest integer to the function argument that is smaller or equal to it.

The next step according to the embodiment is to apply the sinusoidal model according to the above expression and to evolve its K sinusoids in time. The assumption that the time indices of the erased segment compared to the time indices of the prototype frame differs by $n_{-1}$ samples means that the phases of the sinusoids advance by $$\theta_k = 2\pi\cdot\frac{f_k}{f_s}n_{-1}.$$

Hence, the DFT spectrum of the evolved sinusoidal model is given by:

$$Y_0(m) = \frac{1}{2}\sum_{k=1}^{K} a_k\cdot\left(\left(W\left(2\pi\left(\frac{m}{L}+\frac{f_k}{f_s}\right)\right)\cdot e^{-j(\varphi_k+\theta_k)} + W\left(2\pi\left(\frac{m}{L}-\frac{f_k}{f_s}\right)\right)\cdot e^{j(\varphi_k+\theta_k)}\right)\right)$$

Applying again the approximation according to which the shifted window function spectra do no overlap gives:

$$\hat{Y}_0(m) = \frac{a_k}{2}\cdot W\left(2\pi\left(\frac{m}{L}-\frac{f_k}{f_s}\right)\right)\cdot e^{j(\varphi_k+\theta_k)}$$

for non-negative $m \in M_k$ and for each k.

Comparing the DFT of the prototype frame $Y_{-1}(m)$ with the DFT of evolved sinusoidal model $Y_0(m)$ by using the approximation, it is found that the magnitude spectrum remains unchanged while the phase is shifted by $$\theta_k = 2\pi\cdot\frac{f_k}{f_s}n_{-1},$$

for each $m \in M_k$. Hence, the frequency spectrum coefficients of the prototype frame in the vicinity of each sinusoid are shifted proportional to the sinusoidal frequency $f_k$ and the time difference between the lost audio frame and the prototype frame $n_{-1}$.

Hence, according to the embodiment the substitution frame can be calculated by the following expression:

$z(n)=\text{IDTF}\{Z(m)\}$ with $Z(m)=Y(m)\cdot e^{j\theta_k}$ for non-negative $m \in M_k$ and for each $k$.

A specific embodiment addresses phase randomization for DFT indices not belonging to any interval $M_k$. As described above, the intervals $M_k$, k=1 . . . K have to be set such that they are strictly non-overlapping which is done using some parameter δ which controls the size of the intervals. It may happen that δ is small in relation to the frequency distance of two neighboring sinusoids. Hence, in that case it happens that there is a gap between two intervals. Consequently, for the corresponding DFT indices m no phase shift according to the above expression $Z(m)=Y(m)\cdot e^{j\theta_k}$ is defined. A suitable choice according to this embodiment is to randomize the phase for these indices, yielding $Z(m)=Y(m)\cdot e^{j2\pi rand(\cdot)}$, where the function rand(·) returns some random number.

It has been found beneficial for the quality of the reconstructed signals to optimize the size of the intervals $M_k$. In particular, the intervals should be larger if the signal is very tonal, i.e. when it has clear and distinct spectral peaks. This is the case for instance when the signal is harmonic with a clear periodicity. In other cases where the signal has less pronounced spectral structure with broader spectral maxima, it has been found that using small intervals leads to better quality. This finding leads to a further improvement according to which the interval size is adapted according to the properties of the signal. One realization is to use a tonality or a periodicity detector. If this detector identifies the signal as tonal, the δ-parameter controlling the interval size is set to a relatively large value. Otherwise, the δ-parameter is set to relatively smaller values.

Based on the above, the audio frame loss concealment methods involve the following steps:

1. Analyzing a segment of the available, previously synthesized signal to obtain the constituent sinusoidal frequencies $f_k$ of a sinusoidal model, optionally using an enhanced frequency estimation.
2. Extracting a prototype frame $y_{-1}$ from the available previously synthesized signal and calculate the DFT of that frame.
3. Calculating the phase shift $\theta_k$ for each sinusoid k in response to the sinusoidal frequency $f_k$ and the time advance $n_{-1}$ between the prototype frame and the substitution frame. Optionally in this step the size of the interval M may have been adapted in response to the tonality of the audio signal.
4. For each sinusoid k advancing the phase of the prototype frame DFT with $\theta_k$ selectively for the DFT indices related to a vicinity around the sinusoid frequency $f_k$.
5. Calculating the inverse DFT of the spectrum obtained in step 4.

Signal and Frame Loss Property Analysis and Detection

The methods described above are based on the assumption that the properties of the audio signal do not change significantly during the short time duration from the previously received and reconstructed signal frame and a lost frame. In that case it is a very good choice to retain the magnitude spectrum of the previously reconstructed frame and to evolve the phases of the sinusoidal main components detected in the previously reconstructed signal. There are however cases where this assumption is wrong which are for instance transients with sudden energy changes or sudden spectral changes.

Figure 11:
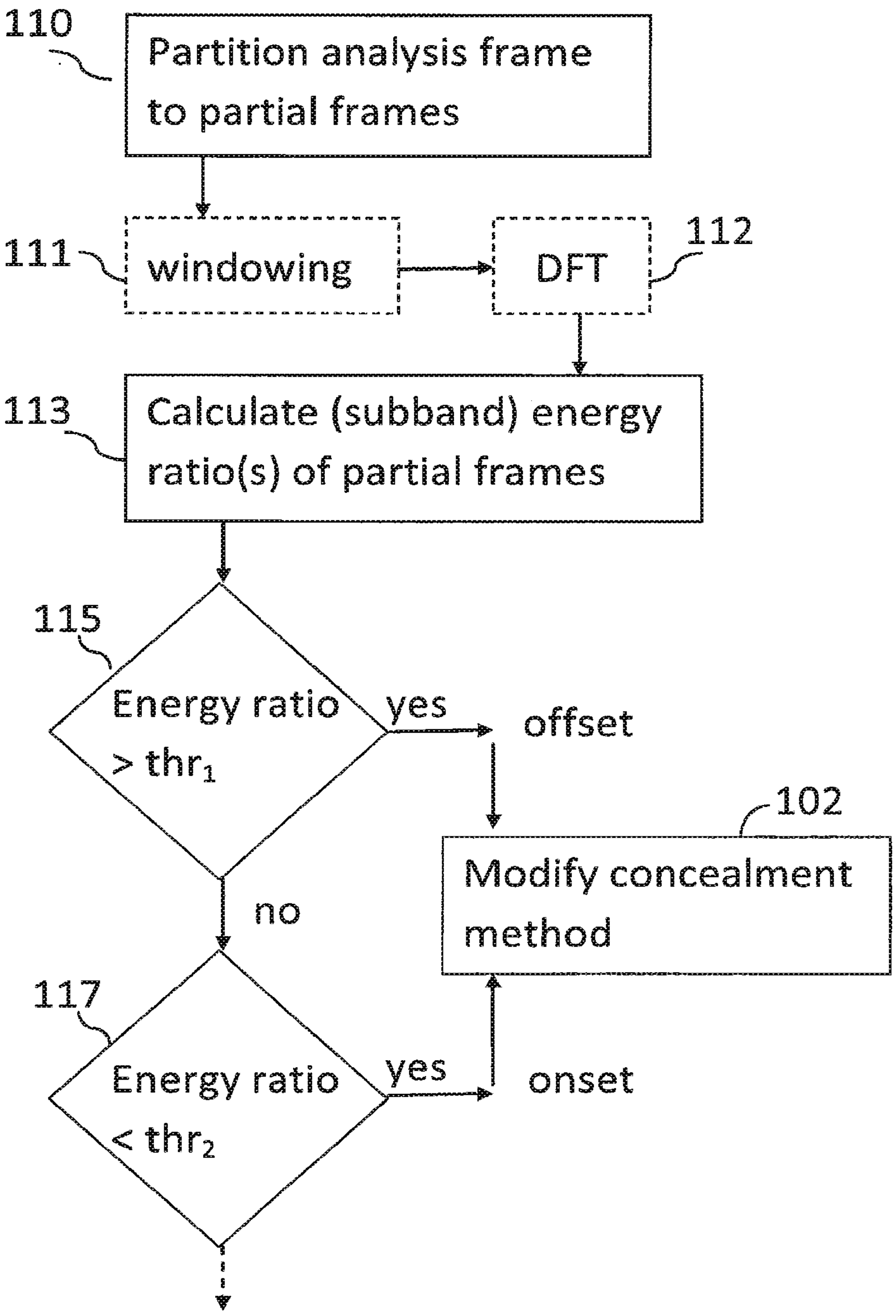
FIG. 11 is a flow chart illustrating another example method according to embodiments of the invention for controlling a concealment method for a lost audio frame of a received audio signal.

A first embodiment of a transient detector according to the invention can consequently be based on energy variations within the previously reconstructed signal. This method, illustrated in FIG. 11, calculates the energy in a left part and a right part of some analysis frame 113. The analysis frame may be identical to the frame used for sinusoidal analysis described above. A part (either left or right) of the analysis frame may be the first or respectively the last half of the analysis frame or e.g. the first or respectively the last quarter of the analysis frame, 110. The respective energy calculation is done by summing the squares of the samples in these partial frames:

$$E_{left}=\sum_{n=0}^{N_{part}-1} y^2(n-n_{left}), \text{ and } E_{right}=\sum_{n=0}^{N_{part}-1} y^2(n-n_{right}).$$

Herein y(n) denotes the analysis frame, $n_{left}$ and $n_{right}$ denote the respective start indices of the partial frames that are both of size $N_{part}$.

Now the left and right partial frame energies are used for the detection of a signal discontinuity. This is done by calculating the ratio $$R_{l/r}=\frac{E_{left}}{E_{right}}.$$

A discontinuity with sudden energy decrease (offset) can be detected if the ratio $R_{l/r}$ exceeds some threshold (e.g. 10), 115. Similarly a discontinuity with sudden energy increase (onset) can be detected if the ratio $R_{l/r}$ is below some other threshold (e.g. 0.1), 117.

In the context of the above described concealment methods it has been found that the above defined energy ratio may in many cases be a too insensitive indicator. In particular in real signals and especially music there are cases where a tone at some frequency suddenly emerges while some other tone at some other frequency suddenly stops. Analyzing such a signal frame with the above-defined energy ratio would in any case lead to a wrong detection result for at least one of the tones since this indicator is insensitive to different frequencies.

A solution to this problem is described in the following embodiment. The transient detection is now done in the time frequency plane. The analysis frame is again partitioned into a left and a right partial frame, 110. Though now, these two partial frames are (after suitable windowing with e.g. a Hamming window, 111) transformed into the frequency domain, e.g. by means of a $N_{part}$-point DFT, 112.

$$Y_{left}(m)=DFT\{y(n-n_{left})\}_{N_{part}} \text{ and}$$

$$Y_{right}(m)=DFT\{y(n-n_{right})\}_{N_{part}}, \text{ with } m=0 \ldots N_{part}-1.$$

Now the transient detection can be done frequency selectively for each DFT bin with index m. Using the powers of the left and right partial frame magnitude spectra, for each DFT index m a respective energy ratio can be calculated 113 as $$R_{l/r}(m)=\frac{|Y_{left}(m)|^2}{|Y_{right}(m)|^2}.$$

Experiments show that frequency selective transient detection with DFT bin resolution is relatively imprecise due to statistical fluctuations (estimation errors). It was found that the quality of the operation is rather enhanced when making the frequency selective transient detection on the basis of frequency bands. Let $l_k=[m_{k-1}+1, \ldots, m_k]$ specify the $k^{th}$ interval, k=1 . . . K, covering the DFT bins from $m_{k-1}+1$ to $m_k$, then these intervals define K frequency bands. The frequency group selective transient detection can now be based on the band-wise ratio between the respective band energies of the left and right partial frames:

$$R_{l/r,band}(k)=\frac{\sum_{m\in I_k}|Y_{left}(m)|^2}{\sum_{m\in I_k}|Y_{right}(m)|^2}.$$

It is to be noted that the interval $I_k=[m_{k-1}+1, \ldots, m_k]$ corresponds to the frequency band $$B_k=\left[\frac{m_{k-1}+1}{N_{part}}\cdot f_s, \ldots, \frac{m_k}{N_{part}}\cdot f_s\right],$$

where $f_s$ denotes the audio sampling frequency.

The lowest lower frequency band boundary $m_0$ can be set to 0 but may also be set to a DFT index corresponding to a larger frequency in order to mitigate estimation errors that grow with lower frequencies. The highest upper frequency band boundary $m_K$ can be set to $$\frac{N_{part}}{2}$$

but is preferably chosen to correspond to some lower frequency in which a transient still has a significant audible effect.

A suitable choice for these frequency band sizes or widths is either to make them equal size with e.g. a width of several 100 Hz. Another preferred way is to make the frequency band widths following the size of the human auditory critical bands, i.e. to relate them to the frequency resolution of the auditory system. This means approximately to make the frequency band widths equal for frequencies up to 1 kHz and to increase them exponentially above 1 kHz. Exponential increase means for instance to double the frequency bandwidth when incrementing the band index k.

As described in the first embodiment of the transient detector that was based on an energy ratio of two partial frames, any of the ratios related to band energies or DFT bin energies of two partial frames are compared to certain thresholds. A respective upper threshold for (frequency selective) offset detection 115 and a respective lower threshold for (frequency selective) onset detection 117 is used.

A further audio signal dependent indicator that is suitable for an adaptation of the frame loss concealment method can be based on the codec parameters transmitted to the decoder. For instance, the codec may be a multi-mode codec like ITU-T G.718. Such codec may use particular codec modes for different signal types and a change of the codec mode in a frame shortly before the frame loss may be regarded as an indicator for a transient.

Another useful indicator for adaptation of the frame loss concealment is a codec parameter related to a voicing property and the transmitted signal. Voicing relates to highly periodic speech that is generated by a periodic glottal excitation of the human vocal tract.

A further preferred indicator is whether the signal content is estimated to be music or speech. Such an indicator can be obtained from a signal classifier that may typically be part of the codec. In case the codec performs such a classification and makes a corresponding classification decision available as a coding parameter to the decoder, this parameter is preferably used as signal content indicator to be used for adapting the frame loss concealment method.

Another indicator that is preferably used for adaptation of the frame loss concealment methods is the burstiness of the frame losses. Burstiness of frame losses means that there occur several frame losses in a row, making it hard for the frame loss concealment method to use valid recently decoded signal portions for its operation. A state-of-the-art indicator is the number $n_{burst}$ of observed frame losses in a row. This counter is incremented with one upon each frame loss and reset to zero upon the reception of a valid frame. This indicator is also used in the context of the present example embodiments of the invention.

Adaptation of the Frame Loss Concealment Method

In case the steps carried out above indicate a condition suggesting an adaptation of the frame loss concealment operation the calculation of the spectrum of the substitution frame is modified.

While the original calculation of the substitution frame spectrum is done according to the expression $Z(m)=Y(m)\cdot e^{j\theta_k}$, now an adaptation is introduced modifying both magnitude and phase. The magnitude is modified by means of scaling with two factors α(m) and β(m) and the phase is modified with an additive phase component ϑ(m). This leads to the following modified calculation of the substitution frame:

$$Z(m)=\alpha(m)\cdot\beta(m)\cdot Y(m)\cdot e^{j(\theta_k+\vartheta(m))}.$$

It is to be noted that the original (non-adapted) frame-loss concealment methods is used if α(m)=1, β(m)=1, and ϑ(m)=0. These respective values are hence the default.

The general objective with introducing magnitude adaptations is to avoid audible artifacts of the frame loss concealment method. Such artifacts may be musical or tonal sounds or strange sounds arising from repetitions of transient sounds. Such artifacts would in turn lead to quality degradations, which avoidance is the objective of the described adaptations. A suitable way to such adaptations is to modify the magnitude spectrum of the substitution frame to a suitable degree.

Figure 12:
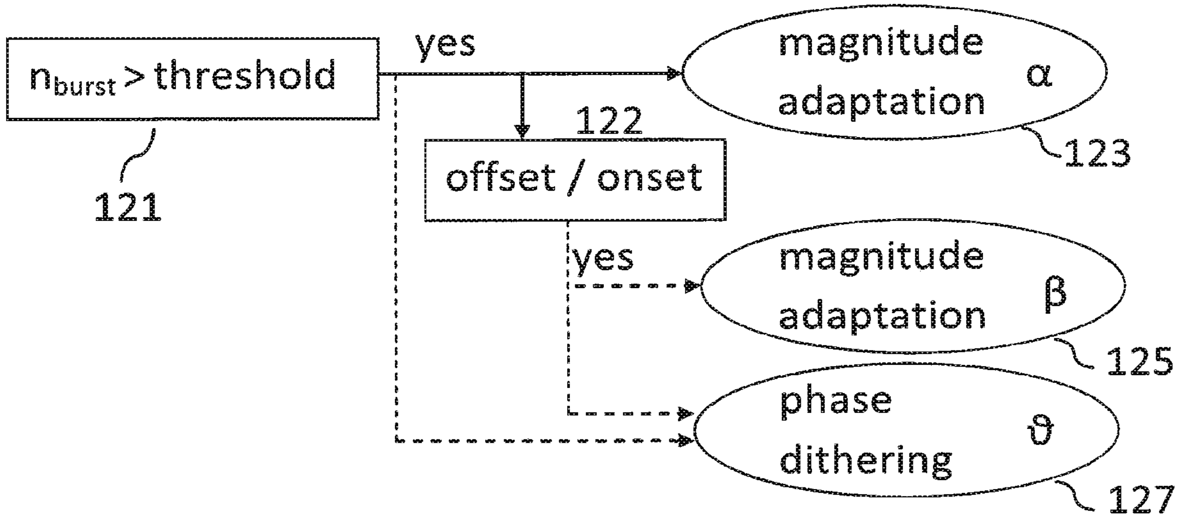
FIG. 12 illustrates another example embodiment of the invention.

FIG. 12 illustrates an embodiment of concealment method modification. Magnitude adaptation, 123, is preferably done if the burst loss counter $n_{burst}$ exceeds some threshold $thr_{burst}$, e.g. $thr_{burst}=3$, 121. In that case a value smaller than 1 is used for the attenuation factor, e.g. α(m)=0.1.

It has however been found that it is beneficial to perform the attenuation with gradually increasing degree. One preferred embodiment which accomplishes this is to define a logarithmic parameter specifying a logarithmic increase in attenuation per frame, att_per_frame. Then, in case the burst counter exceeds the threshold the gradually increasing attenuation factor is calculated by $$\alpha(m)=10^{c\cdot att\_per\_frame\cdot(n_{burst}-thr_{burst})}.$$

Here the constant c is mere a scaling constant allowing to specify the parameter att_per_frame for instance in decibels (dB).

An additional preferred adaptation is done in response to the indicator whether the signal is estimated to be music or speech. For music content in comparison with speech content it is preferable to increase the threshold $thr_{burst}$ and to decrease the attenuation per frame. This is equivalent with performing the adaptation of the frame loss concealment method with a lower degree. The background of this kind of adaptation is that music is generally less sensitive to longer loss bursts than speech. Hence, the original, i.e. the unmodified frame loss concealment method is still preferable for this case, at least for a larger number of frame losses in a row.

A further adaptation of the concealment method with regards to the magnitude attenuation factor is preferably done in case a transient has been detected based on that the indicator $R_{l/r,\,band}(k)$ or alternatively $R_{l/r}(m)$ or $R_{l/r}$ have passed a threshold, 122. In that case a suitable adaptation action, 125, is to modify the second magnitude attenuation factor β(m) such that the total attenuation is controlled by the product of the two factors α(m)·β(m).

β(m) is set in response to an indicated transient. In case an offset is detected the factor β(m) is preferably be chosen to reflect the energy decrease of the offset. A suitable choice is to set β(m) to the detected gain change:

$$\beta(m)=\sqrt{R_{l/r,band}(k)},\ \text{for } m\in I_k,\ k=1\ldots K.$$

In case an onset is detected it is rather found advantageous to limit the energy increase in the substitution frame. In that case the factor can be set to some fixed value of e.g. 1, meaning that there is no attenuation but not any amplification either.

In the above it is to be noted that the magnitude attenuation factor is preferably applied frequency selectively, i.e. with individually calculated factors for each frequency band. In case the band approach is not used, the corresponding magnitude attenuation factors can still be obtained in an analogue way. β(m) can then be set individually for each DFT bin in case frequency selective transient detection is used on DFT bin level. Or, in case no frequency selective transient indication is used at all β(m) can be globally identical for all m.

A further preferred adaptation of the magnitude attenuation factor is done in conjunction with a modification of the phase by means of the additional phase component ϑ(m) 127. In case for a given m such a phase modification is used, the attenuation factor β(m) is reduced even further. Preferably, even the degree of phase modification is taken into account. If the phase modification is only moderate, β(m) is only scaled down slightly, while if the phase modification is strong, β(m) is scaled down to a larger degree.

The general objective with introducing phase adaptations is to avoid too strong tonality or signal periodicity in the generated substitution frames, which in turn would lead to quality degradations. A suitable way to such adaptations is to randomize or dither the phase to a suitable degree.

Such phase dithering is accomplished if the additional phase component ϑ(m) is set to a random value scaled with some control factor: ϑ(m)=a(m)·rand(·).

The random value obtained by the function rand(·) is for instance generated by some pseudo-random number generator. It is here assumed that it provides a random number within the interval [0, 2π].

The scaling factor a(m) in the above equation control the degree by which the original phase $\theta_k$ is dithered. The following embodiments address the phase adaptation by means of controlling this scaling factor. The control of the scaling factor is done in an analogue way as the control of the magnitude modification factors described above.

According to a first embodiment scaling factor a(m) is adapted in response to the burst loss counter. If the burst loss counter $n_{burst}$ exceeds some threshold $thr_{burst}$, e.g. $thr_{burst}=3$, a value larger than 0 is used, e.g. a(m)=0.2.

It has however been found that it is beneficial to perform the dithering with gradually increasing degree. One preferred embodiment which accomplishes this is to define a parameter specifying an increase in dithering per frame, dith_increase_per_frame.

Then in case the burst counter exceeds the threshold the gradually increasing dithering control factor is calculated by $$a(m)=\text{dith\_increase\_per\_frame}\cdot(n_{burst}-thr_{burst}).$$

It is to be noted in the above formula that a(m) has to be limited to a maximum value of 1 for which full phase dithering is achieved.

It is to be noted that the burst loss threshold value $thr_{burst}$ used for initiating phase dithering may be the same threshold as the one used for magnitude attenuation. However, better quality can be obtained by setting these thresholds to individually optimal values, which generally means that these thresholds may be different.

An additional preferred adaptation is done in response to the indicator whether the signal is estimated to be music or speech. For music content in comparison with speech content it is preferable to increase the threshold $thr_{burst}$ meaning that phase dithering for music as compared to speech is done only in case of more lost frames in a row. This is equivalent with performing the adaptation of the frame loss concealment method for music with a lower degree. The background of this kind of adaptation is that music is generally less sensitive to longer loss bursts than speech. Hence, the original, i.e. unmodified frame loss concealment method is still preferable for this case, at least for a larger number of frame losses in a row.

A further preferred embodiment is to adapt the phase dithering in response to a detected transient. In that case a stronger degree of phase dithering can be used for the DFT bins m for which a transient is indicated either for that bin, the DFT bins of the corresponding frequency band or of the whole frame.

Part of the schemes described address optimization of the frame loss concealment method for harmonic signals and particularly for voiced speech.

In case the methods using an enhanced frequency estimation as described above are not realized another adaptation possibility for the frame loss concealment method optimizing the quality for voiced speech signals is to switch to some other frame loss concealment method that specifically is designed and optimized for speech rather than for general audio signals containing music and speech. In that case, the indicator that the signal comprises a voiced speech signal is used to select another speech-optimized frame loss concealment scheme rather than the schemes described above.

Figure 13:
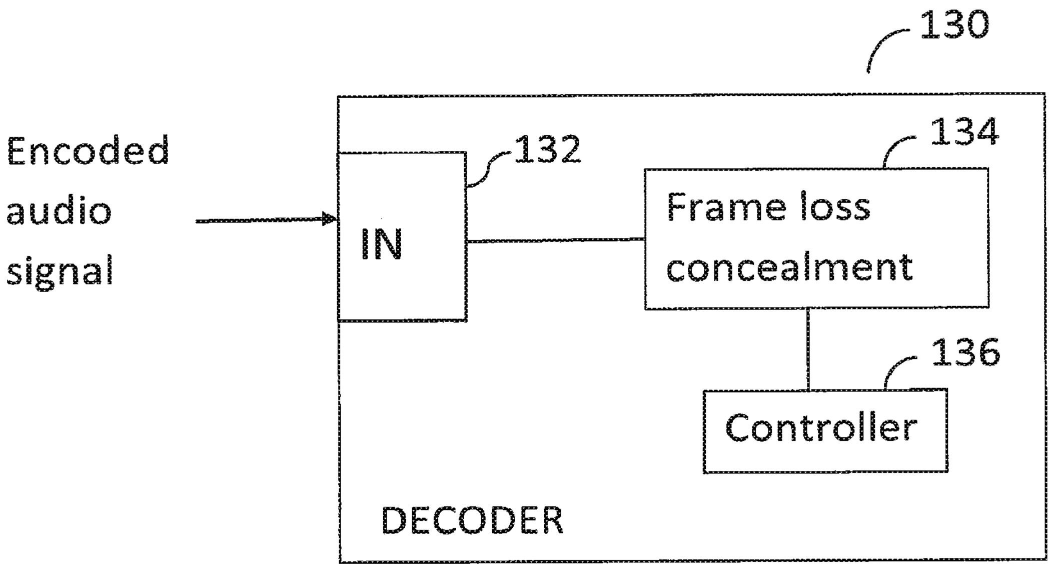
FIG. 13 shows an example of an apparatus according to an embodiment of the invention.
Figure 14:
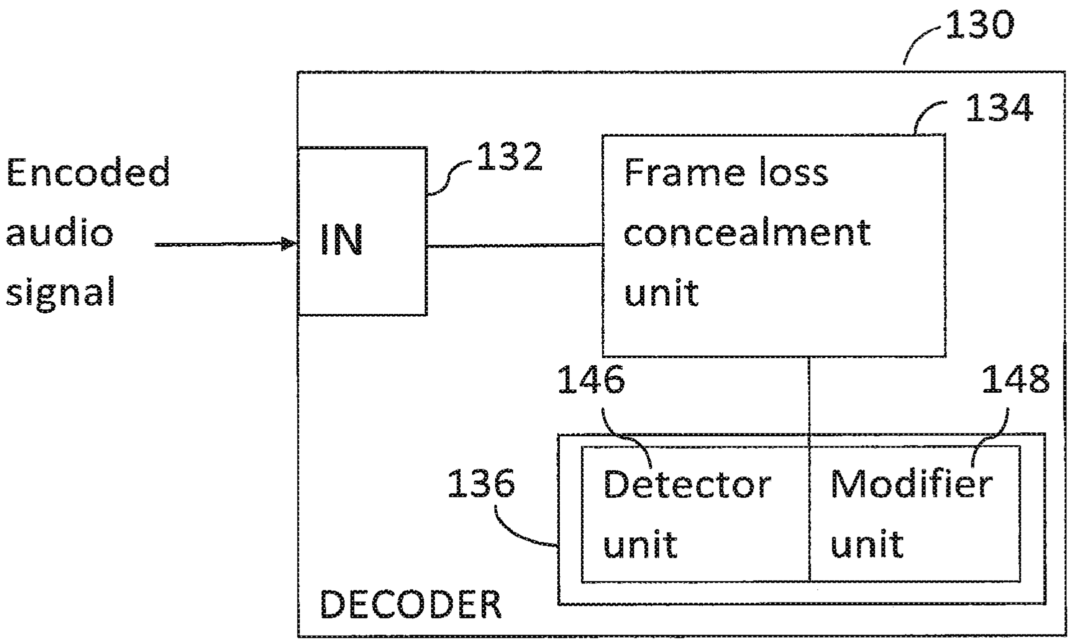
FIG. 14 shows another example of an apparatus according to an embodiment of the invention.

The embodiments apply to a controller in a decoder, as illustrated in FIG. 13. FIG. 13 is a schematic block diagram of a decoder according to the embodiments. The decoder 130 comprises an input unit 132 configured to receive an encoded audio signal. The figure illustrates the frame loss concealment by a logical frame loss concealment-unit 134, which indicates that the decoder is configured to implement a concealment of a lost audio frame, according to the above-described embodiments. Further the decoder comprises a controller 136 for implementing the embodiments described above. The controller 136 is configured to detect conditions in the properties of the previously received and reconstructed audio signal or in the statistical properties of the observed frame losses for which the substitution of a lost frame according to the described methods provides relatively reduced quality. In case such a condition is detected, the controller 136 is configured to modify the element of the concealment methods according to which the substitution frame spectrum is calculated by $Z(m)=Y(m)\cdot e^{j\theta_k}$ by selectively adjusting the phases or the spectrum magnitudes. The detection can be performed by a detector unit 146 and modifying can be performed by a modifier unit 148 as illustrated in FIG. 14.

The decoder with its including units could be implemented in hardware. There are numerous variants of circuitry elements that can be used and combined to achieve the functions of the units of the decoder. Such variants are encompassed by the embodiments. Particular examples of hardware implementation of the decoder is implementation in digital signal processor (DSP) hardware and integrated circuit technology, including both general-purpose electronic circuitry and application-specific circuitry.

Figure 15:
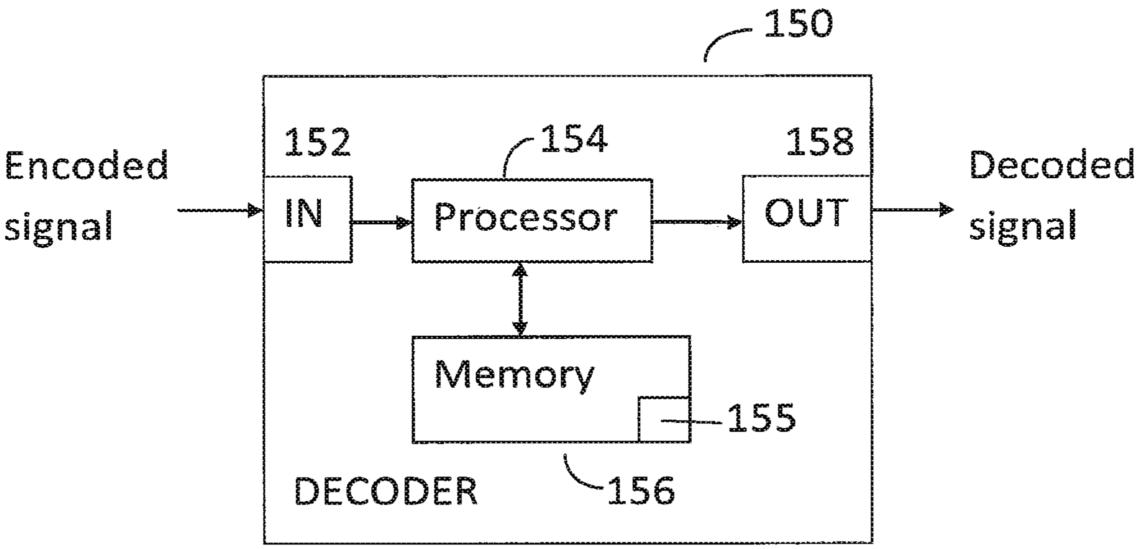
FIG. 15 shows another example of an apparatus according to an embodiment of the invention.

The decoder 150 described herein could alternatively be implemented e.g. as illustrated in FIG. 15, i.e. by one or more of a processor 154 and adequate software 155 with suitable storage or memory 156 therefore, in order to reconstruct the audio signal, which includes performing audio frame loss concealment according to the embodiments described herein, as shown in FIG. 13. The incoming encoded audio signal is received by an input (IN) 152, to which the processor 154 and the memory 156 are connected. The decoded and reconstructed audio signal obtained from the software is outputted from the output (OUT) 158.

The technology described above may be used e.g. in a receiver, which can be used in a mobile device (e.g. mobile phone, laptop) or a stationary device, such as a personal computer.

It is to be understood that the choice of interacting units or modules, as well as the naming of the units are only for exemplary purpose, and may be configured in a plurality of alternative ways in order to be able to execute the disclosed process actions.

It should also be noted that the units or modules described in this disclosure are to be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In the preceding description, for purposes of explanation and not limitation, specific details are set forth such as particular architectures, interfaces, techniques, etc. in order to provide a thorough understanding of the disclosed technology. However, it will be apparent to those skilled in the art that the disclosed technology may be practiced in other embodiments and/or combinations of embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that the figures herein can represent conceptual views of illustrative circuitry or other functional units embodying the principles of the technology, and/or various processes which may be substantially represented in computer readable medium and executed by a computer or processor, even though such computer or processor may not be explicitly shown in the figures.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A frame loss concealment method, wherein a segment of a previously synthesized audio signal is used to generate a prototype frame in order to create a substitution frame for a lost audio frame, the method comprising:

transforming the prototype frame into a frequency domain;

applying a sinusoidal model to the transformed prototype frame to identify the frequency of a sinusoidal component of the audio signal;

calculating a phase shift $\theta_k$ for the sinusoidal component;

shifting a phase of all spectral coefficients in the transformed prototype frame included in an interval $M_k$ around a sinusoid k by the phase shift $\theta_k$ while retaining a magnitude of those spectral coefficients;

randomizing phases of spectral coefficients in the transformed prototype frame that are not phase shifted;

creating the substitution frame for the lost audio frame by performing an inverse frequency transform of a frequency spectrum of the transformed prototype frame, wherein the transformed prototype frame includes the phase shifted spectral coefficients included in the interval $M_k$ and randomized phases of spectral coefficients that are not phase shifted;

substituting the created substitution frame for the lost audio frame in the previously synthesized audio signal; and outputting the previously synthesized audio signal comprising the created substitution frame substituted for the lost audio frame.

2. The frame loss concealment method according to claim 1, wherein the phase shift $\theta_k$ depends on the frequency of the sinusoidal component of the audio signal and a time shift between the prototype frame and the lost audio frame.

3. The frame loss concealment method according to claim 2, wherein the applying the sinusoidal model to the prototype frame to identify the frequency of the sinusoidal component of the audio signal comprises identifying frequencies in a vicinity of peaks of spectrum related to the used frequency domain transform.

4. The frame loss concealment method according to claim 3, wherein the applying the sinusoidal model to the prototype frame to identify the frequency of the sinusoidal component of the audio signal is performed with higher resolution than a frequency resolution of the used frequency domain transform.

5. The frame loss concealment method according to claim 2, wherein the applying the sinusoidal model to the prototype frame to identify the frequency of the sinusoidal component of the audio signal is performed with higher resolution than a frequency resolution of the used frequency domain transform.

6. The frame loss concealment method according to claim 1, wherein the applying the sinusoidal model to the prototype frame to identify the frequency of the sinusoidal component of the audio signal comprises identifying frequencies in a vicinity of peaks of spectrum related to the used frequency domain transform.

7. The frame loss concealment method according to claim 1, wherein the applying the sinusoidal model to the prototype frame to identify the frequency of the sinusoidal component of the audio signal is performed with higher resolution than a frequency resolution of the used frequency domain transform.

8. An apparatus for creating a substitution frame for a lost audio frame, the apparatus comprising:

at least one processor; and at least one memory storing instructions executable by the at least one processor to cause the at least one processor to generate a prototype frame from a segment of a previously synthesized audio signal;

transform the generated prototype frame into a frequency domain;

apply a sinusoidal model to the transformed prototype frame to identify the frequency of a sinusoidal component of the audio signal;

calculate a phase shift $\theta_k$ for the sinusoidal component;

shift a phase of all spectral coefficients in the transformed prototype frame included in an interval $M_k$ around a sinusoid k by the phase shift $\theta_k$ while retaining a magnitude of those spectral coefficients;

randomize phases of spectral coefficients in the transformed prototype frame that are not phase shifted;

create the substitution frame for the lost audio frame by performing an inverse frequency transform of a frequency spectrum of the transformed prototype frame, wherein the transformed prototype frame includes the phase shifted spectral coefficients included in the interval $M_k$ and randomized phases of spectral coefficients that are not phase shifted;

substitute the created substitution frame for the lost audio frame in the previously synthesized audio signal; and output the previously synthesized audio signal comprising the created substitution frame substituted for the lost audio frame.

9. The apparatus according to claim 8, wherein the phase shift $\theta_k$ depends on the frequency of the sinusoidal component of the audio signal and a time shift between the prototype frame and the lost audio frame.

10. The apparatus according to claim 9, wherein the applying the sinusoidal model to the prototype frame to identify the frequency of the sinusoidal component of the audio signal comprises identifying frequencies in a vicinity of peaks of the spectrum related to the used frequency domain transform.

11. The apparatus according to claim 10, wherein the applying the sinusoidal model to the prototype frame to identify the frequency of the sinusoidal component of the audio signal is performed with higher resolution than a frequency resolution of the used frequency domain transform.

12. The apparatus according to claim 9, wherein the applying the sinusoidal model to the prototype frame to identify the frequency of the sinusoidal component of the audio signal is performed with higher resolution than a frequency resolution of the used frequency domain transform.

13. The apparatus according to claim 8, wherein the applying the sinusoidal model to the prototype frame to identify the frequency of the sinusoidal component of the audio signal comprises identifying frequencies in a vicinity of peaks of the spectrum related to the used frequency domain transform.

14. The apparatus according to claim 8, wherein the applying the sinusoidal model to the prototype frame to identify the frequency of the sinusoidal component of the audio signal is performed with higher resolution than a frequency resolution of the used frequency domain transform.

15. An audio decoder comprising the apparatus according to claim 8.

16. A device comprising the audio decoder according to claim 15.

17. A computer program product comprising a non-transitory computer-readable medium storing instructions which, when executed on at least one processor of an apparatus for creating a substitution frame for a lost audio frame, cause the at least one processor to perform operations to:

generate a prototype frame from a segment of a previously synthesized audio signal;

transform the prototype frame into a frequency domain;

apply a sinusoidal model to the transformed prototype frame to identify the frequency of a sinusoidal component of the audio signal;

calculate a phase shift $\theta_k$ for the sinusoidal component;

shift a phase of all spectral coefficients in the transformed prototype frame included in an interval $M_k$ around a sinusoid k by the phase shift $\theta_k$ while retaining a magnitude of those spectral coefficients;

randomize phases of spectral coefficients in the transformed prototype frame that are not phase shifted; and create the substitution frame for the lost audio frame by performing an inverse frequency transform of a frequency spectrum of the transformed prototype frame, wherein the transformed prototype frame includes the phase shifted spectral coefficients included in the interval $M_k$ and randomized phases of spectral coefficients that are not phase shifted;

substitute the created substitution frame for the lost audio frame in the previously synthesized audio signal; and output the previously synthesized audio signal comprising the created substitution frame substituted for the lost audio frame.

18. The computer program product according to claim 17, wherein the phase shift Ok depends on the frequency of the sinusoidal component of the audio signal and a time shift between the prototype frame and the lost audio frame.

19. The computer program product according to claim 18, wherein the operation to apply the sinusoidal model to the prototype frame to identify the frequency of the sinusoidal component of the audio signal comprises to identify frequencies in a vicinity of peaks of the spectrum related to the used frequency domain transform.

20. The computer program product according to claim 19, wherein the operation to apply the sinusoidal model to the prototype frame to identify the frequency of the sinusoidal component of the audio signal is performed with higher resolution than a frequency resolution of the used frequency domain transform.

21. The computer program product according to claim 18, wherein the operation to apply the sinusoidal model to the prototype frame to identify the frequency of the sinusoidal component of the audio signal is performed with higher resolution than a frequency resolution of the used frequency domain transform.

22. The computer program product according to claim 17, wherein the operation to apply the sinusoidal model to the prototype frame to identify the frequency of the sinusoidal component of the audio signal comprises to identify frequencies in a vicinity of peaks of the spectrum related to the used frequency domain transform.

23. The computer program product according to claim 17, wherein the operation to apply the sinusoidal model to the prototype frame to identify the frequency of the sinusoidal component of the audio signal is performed with higher resolution than a frequency resolution of the used frequency domain transform.

* * * * *